United States Patent
Miwa et al.

(10) Patent No.: US 9,598,307 B2
(45) Date of Patent: Mar. 21, 2017

(54) GLASS AND GLASS SUBSTRATE

(71) Applicant: Nippon Electric Glass Co., Ltd., Shiga (JP)

(72) Inventors: Shinkichi Miwa, Shiga (JP); Masahiro Hayashi, Shiga (JP)

(73) Assignee: NIPPON ELECTRONIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/441,280

(22) PCT Filed: Dec. 6, 2013

(86) PCT No.: PCT/JP2013/082882
§ 371 (c)(1),
(2) Date: May 7, 2015

(87) PCT Pub. No.: WO2014/092026
PCT Pub. Date: Jun. 19, 2014

(65) Prior Publication Data
US 2015/0315065 A1    Nov. 5, 2015

(30) Foreign Application Priority Data

Dec. 14, 2012 (JP) ................................ 2012-273050

(51) Int. Cl.
  *C03C 3/091*  (2006.01)
  *C03C 3/095*  (2006.01)
  *C03C 3/093*  (2006.01)

(52) U.S. Cl.
  CPC .............. *C03C 3/091* (2013.01); *C03C 3/093* (2013.01); *C03C 3/095* (2013.01)

(58) Field of Classification Search
  CPC .................................. C03C 3/091; C03C 3/095
  See application file for complete search history.

(56) References Cited

U.S. PATENT DOCUMENTS

| | | | | |
|---|---|---|---|---|
| 5,811,361 A * | 9/1998 | Miwa | ...................... | C03C 3/093 501/66 |
| 5,851,939 A * | 12/1998 | Miwa | ...................... | C03C 3/091 501/66 |
| 6,465,381 B1 * | 10/2002 | Lautenschlager | ....... | C03C 3/095 501/27 |
| 7,763,559 B2 * | 7/2010 | Kurachi | ................... | C03C 3/091 501/66 |
| 8,426,327 B2 * | 4/2013 | Yanase | ................... | C03B 17/064 501/67 |
| 9,023,744 B2 * | 5/2015 | Kawaguchi | ............. | C03C 3/091 501/66 |
| 2002/0151426 A1 * | 10/2002 | Murata | .................... | C03C 3/091 501/66 |
| 2009/0109654 A1 * | 4/2009 | Fechner | ................... | C03C 3/068 362/97.1 |
| 2009/0226733 A1 * | 9/2009 | Kato | ..................... | C03B 17/067 428/428 |
| 2009/0275462 A1 * | 11/2009 | Murata | .................... | C03C 3/091 501/66 |
| 2009/0294773 A1 | 12/2009 | Ellison | | |
| 2010/0045164 A1 * | 2/2010 | Fechner | ................... | C03C 3/089 313/493 |
| 2011/0318561 A1 * | 12/2011 | Murata | .................... | C03C 3/093 428/220 |
| 2012/0058306 A1 * | 3/2012 | Miwa | ...................... | C03C 3/091 428/141 |
| 2012/0282450 A1 * | 11/2012 | Kawaguchi | ............. | C03C 3/093 428/220 |

FOREIGN PATENT DOCUMENTS

| | | |
|---|---|---|
| CN | 1807308 | 7/2006 |
| JP | 2001-48573 | 2/2001 |
| JP | 2002-3240 | 1/2002 |
| JP | 2009-286689 | 12/2009 |

OTHER PUBLICATIONS

Machine Translation JP 2002-3240 A, Jan. 9, 2002.*
Patent Cooperation Treaty (PCT) International Preliminary Report on Patentability issued Jun. 16, 2015 in International Application No. PCT/JP2013/082882.
International Search Report issued Feb. 25, 2014 in International (PCT) Application No. PCT/JP2013/082882.
Chinese Office Action issued May 26, 2016 in corresponding Chinese Application No. 201380047108.X (with partial English translation).

* cited by examiner

*Primary Examiner* — Elizabeth A Bolden
(74) *Attorney, Agent, or Firm* — Wenderoth, Lind & Ponack, L.L.P.

(57) ABSTRACT

Devised are a glass and glass substrate, which contain an alkaline component at a low content, are low in density and thermal expansion coefficient, are high in strain point and Young's modulus, and are excellent in devitrification resistance, meltability, formability, and the like. That is, the glass of the present invention includes as a glass composition, in terms of mass %, 58 to 70% of $SiO_2$, 16 to 25% of $Al_2O_3$, 3 to 8% of $B_2O_3$, 0 to 5% of MgO, 3 to 13% of CaO, 0 to 6% of SrO, 0 to 6% of BaO, 0 to 5% of ZnO, 0 to 5% of $ZrO_2$, 0 to 5% of $TiO_2$, and 0 to 5% of $P_2O_5$.

9 Claims, 1 Drawing Sheet

GLASS AND GLASS SUBSTRATE

TECHNICAL FIELD

The present invention relates to a glass and a glass substrate, and more specifically, to a glass and glass substrate suitable for an OLED display or a liquid crystal display. More particularly, the present invention relates to a glass and glass substrate suitable for a display driven by an oxide TFT or a low-temperature p-Si.TFT (LTPS).

BACKGROUND ART

A glass substrate has hitherto been widely used as a substrate for a flat panel display such as a liquid crystal display, a hard disk, a filter, a sensor, or the like. In recent years, in addition to a conventional liquid crystal display, an OLED display has been actively developed by virtue of its self-luminescence, high color reproducibility, wide viewing angle, high-speed response, high definition, and the like. Some of the developed OLED displays have already been put to practical use. Meanwhile, a display for a mobile device such as a smartphone requires a screen with ultra-high definition, because such display has a small area but needs to display a lot of information. Besides, such display requires high-speed response as well, because a moving image is displayed thereon.

In such application, an OLED display or a liquid crystal display driven by a LTPS is suitable. The OLED display emits light when an electric current flows through an OLED element serving as a constituent of a pixel. Therefore, a material exhibiting low resistance and a high electron mobility is used as a drive TFT element. As such material, an oxide TFT formed typically of indium gallium zinc oxide (IGZO) has attracted attention, aside from the above-mentioned LTPS. The oxide TFT has low resistance, a high mobility, and can be formed at relatively low temperature. The conventional p-Si.TFT, in particular the LTPS, is liable to have variations in TFT characteristics upon its formation on a large-size glass substrate, owing to instability of an excimer laser to be used in polycrystallization of an amorphous Si (a-Si) film. Therefore, in a TV application or the like, display unevenness is liable to occur in a screen. In contrast, the oxide TFT is excellent in homogeneity of TFT characteristics upon its formation on a large-size glass substrate. Therefore, the oxide TFT has attracted attention as a potential TFT formation material, and some of the oxide TFTs have already been put to practical use.

SUMMARY OF INVENTION

Technical Problem

A glass substrate to be used for a high-definition display is required to have various demand characteristics. In particular, the following characteristics (1) to (5) are required.

(1) To contain an alkaline component (in particular, a Li component or a Na component) at a low content or be substantially free of the alkaline component, because an alkali ion is diffused during heat treatment into a semiconductor substance having been formed into a film and causes degradation in the characteristics of the film when glass contains the alkaline component at a high content.

(2) To have excellent chemical resistance, because various chemicals such as an acid or an alkali are used in a photolithography and etching step.

(3) To undergo less thermal shrinkage, in particular have a high strain point, because the glass substrate is subjected to heat treatment at several hundred degrees C. in steps of film formation, annealing, and the like, and hence a pattern shift or the like is liable to occur when the glass substrate undergoes thermal shrinkage during the heat treatment.

(4) To have a thermal expansion coefficient close to that of a film member to be formed on the glass substrate (for example, of a-Si or p-Si), for example, have a thermal expansion coefficient of from 30 to $40 \times 10^{-7}$/° C. It should be noted that a thermal expansion coefficient of $40 \times 10^{-7}$/° C. or less improves thermal shock resistance as well.

(5) To have a high Young's modulus (or a high specific Young's modulus) in order to suppress failures attributed to the deflection of the glass substrate.

Further, glass is required to have the following characteristics (6) and (7) from the viewpoint of manufacturing a glass substrate.

(6) To have excellent meltability in order to prevent melt defects such as bubbles, stones, and cords.

(7) To have excellent devitrification resistance in order to avoid the generation of foreign matter in the glass substrate.

The present invention has been made in view of the above-mentioned circumstances, and a technical object of the present invention is to devise a glass and glass substrate, which satisfy the above-mentioned demand characteristics (1) to (7) and are suitable for an OLED display or liquid crystal display driven by a LTPS or oxide TFT element. Specifically, a technical, object of the present invention is to devise a glass and glass substrate, which contain an alkaline component at a low content, are low in density and thermal expansion coefficient, are high in strain point and Young's modulus, and are excellent in devitrification resistance, meltability, formability, and the like.

Solution to Problem

The inventors of the present invention have repeatedly performed various experiments. As a result, the inventors have found that the technical object can be achieved by restricting a glass composition within a predetermined range. Thus, the inventors propose the finding as the present invention. That is, a glass of the present invention comprises as a glass composition, in terms of mass %, 58 to 70% of $SiO_2$, 16 to 25% of $Al_2O_3$, 3 to 8% of $B_2O_3$, 0 to 5% of MgO, 3 to 13% of CaO, 0 to 6% of SrO, 0 to 6% of BaO, 0 to 5% of ZnO, 0 to 5% of $ZrO_2$, 0 to 5% of $TiO_2$, and 0 to 5% of $P_2O_5$.

The inventors have focused on a $SiO_2$—$Al_2O_3$—$B_2O_3$—RO (RO: alkaline earth metal oxide, MgO+CaO+SrO+BaO)-based glass as a glass satisfying the above-mentioned demand characteristics (1) to (7), and found that a high strain point and satisfactory chemical resistance can be simultaneously achieved by restricting the content of $SiO_2$ to 58% or more, the content of $Al_2O_3$ to from 16 to 25%, and the content of $B_2O_3$ to from 3 to 8%. In addition, the inventors have found that the Young's modulus, the devitrification resistance, and the like are improved by optimizing the contents of $SiO_2$, $Al_2O_3$, $B_2O_3$, and RO. Further, the inventors have found that the meltability, the formability, the devitrification resistance, and the like are improved by optimizing the contents of $B_2O_3$, MgO, and CaO.

Second, a glass of the present invention preferably comprises as a glass composition, in terms of mass %, 58 to 70% of $SiO_2$, 16 to 25% of $Al_2O_3$, 3 to 8% of $B_2O_3$, 0 to 5% of MgO, 3 to 13% of CaO, 0 to 6% of SrO, 0 to 6% of BaO, 0 to 5% of ZnO, 0 to 5% of $ZrO_2$, 0 to 5% of $TiO_2$, and 0 to 5% of $P_2O_5$, is substantially free of a Li component and a Na component, and has a density of from 2.43 to 2.52 g/cm³ and a strain point of 680° C. or more. Herein, the "substantially free of" refers to the case where the content of the explicit component is 0.1% or less (preferably 0.05% or less). For example, the "substantially free of a Li component" refers to the case where the content of a Li component is 0.1% or less (preferably 0.05% or less). The "density" may be measured by a well-known Archimedes method. The "strain point" refers to a value measured by a method in accordance with ASTM C336.

Third, a glass of the present invention is substantially free of a Li component and a Na component, and has a density of from 2.43 to 2.52 g/cm³, a thermal expansion coefficient of from 30 to 40×10⁻⁷/° C., a Young's modulus of 75 GPa or more, a strain point of 680° C. or more and less than 740° C., a temperature at $10^{5.8}$ dPa·s of 1,250° C. or less, a temperature at $10^{2.5}$ dPa·s of 1,650° C. or less, and a liquidus viscosity of $10^{5.8}$ dPa·s or more. Herein, the "thermal expansion coefficient" refers to an average thermal expansion coefficient measured in the temperature range of from 30 to 380° C.," and may be measured with, for example, a dilatometer. The "Young's modulus" refers to a value measured by a dynamic elastic modulus measurement method (resonance method) in accordance with JIS R1602. The "temperature at $10^{5.8}$ dPa·s" may be measured by, for example, a platinum sphere pull up method. The "temperature at $10^{2.5}$ dPa·s" may be measured by, for example, a platinum sphere pull up method. The "liquidus viscosity" refers to the viscosity of glass at at a liquidus temperature (liquidus line temperature) and may be measured by, for example, a platinum sphere pull up method. The "liquidus temperature" refers to a temperature at which devitrification (crystalline foreign matter) is observed in glass when glass powder that passed through a standard 30-mesh sieve (500 μm) and remained on a 50-mesh sieve (300 μm) is placed in a platinum boat and kept for 24 hours in a gradient heating furnace, followed by taking the platinum boat out of the gradient heating furnace.

Fourth, it is preferred that the glass of the present invention comprise as a glass composition, in terms of mass %, 59 to 67% of $SiO_2$, 17 to 22% of $Al_2O_3$, 4 to 7% of $B_2O_3$, 0 to 4% of MgO, 3 to 12% of CaO, 0 to 5% of SrO, 0.1 to 5% of BaO, 0 to 5% of ZnO, 0 to 5% of $ZrO_2$, 0 to 5% of $TiO_2$, 0 to 5% of $P_2O_5$, and 0 to 5% of $SnO_2$, and be substantially free of a Li component and a Na component.

Fifth, it is preferred that the glass of the present invention comprise as a glass composition, in terms of mass %, 60 to 65% of $SiO_2$, 17 to 22% of $Al_2O_3$, 4 to 7% of $B_2O_3$, 0 to 3% of MgO, 4 to 10% of CaO, 0 to 5% of SrO, 0.1 to 5% of BaO, 0 to 1% of ZnO, 0 to 1% of $ZrO_2$, 0 to 1% of $TiO_2$, 0 to 3% of $P_2O_5$, and 0.01 to 1% of $SnO_2$, and be substantially free of a Li component and a Na component.

Sixth, a glass substrate of the present invention comprises any one of the above-mentioned glasses.

Seventh, the glass substrate of the present invention is preferably used for an OLED display.

Eighth, the glass substrate of the present invention is preferably used for a liquid crystal display.

Ninth, the glass substrate of the present invention is preferably used for a display driven by an oxide TFT.

DESCRIPTION OF EMBODIMENTS

Figure 1A:
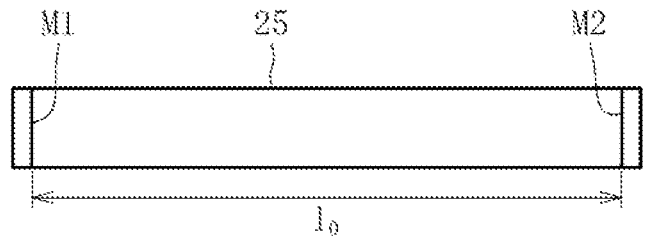
FIG. 1a is a front view illustrating a state in which marks are placed on a glass substrate according to Example of the present invention for calculating the thermal shrinkage value of the glass substrate.

The reasons why the contents of the components are restricted as described above are hereinafter described. It should be noted that the expression "%" refers to "mass %" in the descriptions of the components.

When the content of $SiO_2$ is too small, chemical resistance, in particular, acid resistance lowers, a strain point lowers, and it becomes difficult to achieve a low density. In contrast, when the content of $SiO_2$ is too large, a viscosity at high temperature becomes higher, and meltability is liable to lower. In addition, cristobalite is liable to be devitrified, and defects such as devitrified foreign matter are liable to occur in glass. The upper limit content of $SiO_2$ is preferably 70%, 68%, 66%, 65%, or 64%, and the lower limit content is preferably 58%, 59%, 60%, or 61%. The content most preferably falls within a range of from 61 to 64%.

When the content of $Al_2O_3$ is too small, the strain point lowers, a thermal shrinkage value becomes higher, a Young's modulus lowers, and a glass substrate is liable to be deflected. In contrast, when the content of $Al_2O_3$ is too large, buffered hydrofluoric acid (BHF) resistance lowers and white turbidity is liable to occur in the surface of the glass. In addition, crack resistance is liable to lower. Further, mullite or anorthite is liable to be devitrified in the glass. The upper limit content of $Al_2O_3$ is preferably 25%, 23%, 22%, 21%, or 20%, and the lower limit content is preferably 17%, 17.5%, or 18%. The content most preferably falls within a range of from 18 to 20%.

$B_2O_3$ is a component that acts as a melting accelerate component, and lowers the viscosity and enhances the meltability. The content of $B_2O_3$ is preferably from 3 to 8%, from 3 to 7%, or from 4 to 7%. When the content of $B_2O_3$ is too small, $B_2O_3$ does not act sufficiently as a melting accelerate component, and the BHF resistance and the crack resistance are liable to lower. In addition, the liquidus temperature is liable to increase. In contrast, when the content of $B_2O_3$ is too large, the strain point, heat resistance, and the acid resistance are liable to lower. In particular, when the content of $B_2O_3$ is 7% or more, such tendencies are remarkable. In addition, when the content of $B_2O_3$ is too large, the Young's modulus lowers, and the deflection amount of the glass substrate is liable to increase.

In consideration of the balance between the strain point and the meltability, the mass ratio $Al_2O_3/B_2O_3$ is preferably from 1 to 5, from 1.5 to 4.5, from 2 to 4, or from 2.5 to 3.5.

MgO is a component that enhances the meltability by lowering the viscosity at high temperature without lowering the strain point. In addition, MgO is most effective in reducing the density among ROs. However, excessive introduction of MgO is liable to cause an increase in the liquidus temperature. Further, MgO is a component that is susceptible to a reaction with BHF or hydrofluoric acid to form a product. The reaction product may cause white turbidity in an element on the surface of the glass substrate or in the glass substrate through fixation onto the element or adhesion onto the glass substrate. Therefore, the content of MgO is preferably from 0 to 5%, more preferably from 0 to 4%, still more preferably from 0 to 3%, most preferably from 0 to 2.51.

As with MgO, CaO is a component that remarkably enhances the meltability by lowering the viscosity at high temperature without lowering the strain point. When the content of CaO is too large, devitrification is liable to occur. In addition, the BHF resistance lowers, and the reaction product may cause white turbidity in the element on the surface of the glass substrate or in the glass substrate through fixation onto the element or adhesion onto the glass substrate. The upper limit content of CaO is preferably 12%, 11%, 10.5%, or 10%, and the lower limit content is preferably 3%, 3.5%, or 4%. The content most preferably falls within a range of from 4 to 10%.

SrO is a component that enhances the chemical resistance and the devitrification resistance. However, when its ratio in the ROs is excessively high, the meltability is liable to lower, and the density and a thermal expansion coefficient are liable to increase. Therefore, the content of SrO is preferably from 0 to 6%, from 0 to 5%, or from 0 to 4.5%.

BaO is a component that enhances the chemical resistance and the devitrification resistance. However, when its content is too large, the density is liable to increase. In addition, BaO is less effective in enhancing the meltability among the ROs. A $SiO_2$—$Al_2O_3$—$B_2O_3$—RO-based glass according to the present invention is generally hard to melt, and hence it is significantly important to enhance the meltability and reduce a defective rate attributed to bubbles, foreign matter, or the like from the viewpoint of supplying a high-quality glass substrate at low cost in large numbers. Therefore, the content of BaO is preferably from 0 to 6%, from 0.1 to 5%, or from 0.5 to 4%. It should be noted that, in the $SiO_2$—$Al_2O_3$—$B_2O_3$—RO-based glass according to the present invention, a lower content of $SiO_2$ effectively enhances the meltability, but is liable to lower the acid resistance, and concurrently increase the density and the thermal expansion coefficient.

MgO, SrO, and BaO each have property of enhancing the crack resistance, as compared to CaO. Therefore, the content of MgO+SrO+BaO (the total content of MgO, SrO, and BaO) is preferably 2% or more, 3% or more, or more than 3%. However, when the content of MgO+SrO+BaO is too large, the density and the thermal expansion coefficient are liable to increase. Therefore, the content of MgO+SrO+BaO is preferably 9% or less, or 8% or less.

When the ROs are mixed and introduced, the liquidus temperature significantly lowers and crystalline foreign matter is hardly generated in the glass, and the meltability and formability are improved. However, when the content of the ROs is too large, the density increases, and it becomes difficult to achieve a reduction in weight of the glass substrate. Therefore, the content of the ROs is preferably less than 15%, or less than 14%. The content preferably falls within a range of 2% or more and less than 13%.

In view of the optimization of the mixed ratio of the ROs, the mass ratio CaO/(MgO+SrO+BaO) is preferably 0.7 or more, 0.8 or more, 0.9 or more, or 1 or more, and the mass ratio CaO/MgO is preferably 2 or more, 3 or more, 4 or more, or 5 or more.

ZnO is a component that improves the meltability and the BHF resistance. However, when its content is too large, it is difficult to secure the heat resistance, because the glass is liable to be devitrified or the strain point lowers. Therefore, the content of ZnO is preferably from 0 to 5% or from 0 to 1%.

$ZrO_2$ is a component that enhances chemical durability. However, when its introduction amount is too large, devitrification stones of $ZrSiO_4$ are liable to be generated. The lower limit content of $ZrO_2$ is preferably 1%, 0.5%, 0.3%, 0.2%, or 0.1%. It is preferred to introduce $ZrO_2$ at a content of 0.005 or more from the viewpoint of the chemical durability. The content most preferably falls within a range of from 0.005 to 0.1%. It should be noted that $ZrO_2$ may be introduced from a raw material or through elution from a refractory.

$TiO_2$ has an effect of enhancing the meltability by lowering the viscosity at high temperature, and an effect of enhancing the chemical durability as well. However, when its introduction amount becomes excessive, an ultraviolet light transmittance is liable to lower. The content of $TiO_2$ is preferably 3% or less, 1% or less, 0.5% or less, 0.1% or less, 0.05% or less, or 0.03% or less. It should be noted that, when $TiO_2$ is introduced in an extremely small amount (for example, 0.001% or more), an effect of suppressing coloration caused by ultraviolet light is obtained.

$P_2O_5$ is a component that increases the strain point and is a component that is capable of suppressing the precipitation of devitrified crystals of alkaline-earth aluminosilicate-based compounds such as anorthite. It should be noted that, when the content of $P_2O_5$ is large, the glass is liable to undergo phase separation. The content of $P_2O_5$ is preferably from 0 to 5%, from 0 to 3%, from 0 to 2%, from 0 to 1%, or from 0 to 0.5%.

As a fining agent, there may be used $As_2O_3$, $Sb_2O_3$, $SnO_2$, $SO_3$, $Fe_2O_3$, $CeO_2$, $F_2$, $Cl_2$, C, metal powder such as Al powder or Si powder, or the like. The total content of those fining agents is preferably 3% or less.

$As_2O_3$ and $Sb_2O_3$ are chemical substances of concern. Therefore, it is desired to use those substances in as small amounts as possible. Each of the contents of $As_2O_3$ and $Sb_2O_3$ is preferably less than 0.3%, less than 0.1%, less than 0.09%, less than 0.05%, less than 0.03%, less than 0.01%, less than 0.005%, or less than 0.003%.

$SnO_2$ has a reduction action on bubbles in the glass as a fining agent, and has an effect of maintaining the ultraviolet light transmittance to a relatively high level when coexisting with $Fe_2O_3$ or FeO. However, when the content of $SnO_2$ is too large, devitrification stones of $SnO_2$ are liable to be generated in the glass. The upper limit content of $SnO_2$ is preferably 0.5%, 0.4%, or 0.3%, and the lower limit content is preferably 0.01%, 0.05%, or 0.1%. The content most preferably falls within a range of from 0.1 to 0.4%. In addition, when $SnO_2$ is introduced at a content of from 0.01 to 0.5% with respect to the content of $Fe_2O_3$ or FeO set to from 0.01 to 0.05% in terms of $Fe_2O_3$, bubble quality and the ultraviolet light transmittance can be enhanced. Herein, the "in terms of $Fe_2O_3$" refers to a value obtained by converting the entire Fe amount to a $Fe_2O_3$ amount irrespective of the valence.

In the case where the content of $SnO_2$ is from 0.01 to 0.5%, the glass is liable to be colored when the content of $Rh_2O_3$ is too large. It should be noted that $Rh_2O_3$ may be mixed in from a manufacturing vessel made of platinum. The content of $Rh_2O_3$ is preferably from 0 to 0.0005%, more preferably from 0.00001 to 0.0001%.

$SO_3$ is a component that is mixed in from the raw material as an impurity. When the content of $SO_3$ is too large, bubbles called reboil are generated during melting and forming, and defects may occur in the glass. The upper limit content of $SO_3$ is preferably 0.005%, 0.003%, 0.002%, or 0.001%, and the lower limit content is preferably 0.0001%. The content most preferably falls within a range of from 0.0001% to 0.001%.

Iron is a component that is mixed in from the raw material as an impurity. When the content of iron is too large, the ultraviolet light transmittance may lower. When the ultraviolet light transmittance lowers, failures may occur in a photolithography step of producing a THT or in a step of aligning a liquid crystal by using ultraviolet light. Thus, the lower limit content of iron in terms of $Fe_2O_3$ is preferably 0.001%, and the upper limit content in terms of $Fe_2O_3$ is preferably 0.05%, 0.04%, 0.03%, or 0.02%. The content most preferably falls within a range of from 0.001% to 0.02%.

$Cr_2O_3$ is a component that is mixed in from the raw material as an impurity. When the content of $Cr_2O_3$ is too large, failures may occur in a foreign matter test for an internal portion of a glass substrate using scattered light from incident light entering from an end surface of the glass substrate, because the light is hard to transmit during the test. Particularly in the case where the substrate has a size measuring 730 mm×920 mm or more, such failures are more liable to occur. In addition, in the case where the glass substrate has a small thickness (for example, 0.5 mm or less, 0.4 mm or less, or 0.3 mm or less), the restriction on the content of $Cr_2O_3$ is of great significance because the incident light entering from an end surface of the glass substrate is reduced. The upper limit content of $Cr_2O_3$ is preferably 0.001%, 0.0008%, 0.0006%, 0.0005%, or 0.0003%, and the lower limit content is preferably 0.00001.%. The content most preferably falls within a range of from 0.00001 to 0.0003%.

An alkaline component, in particular, a Li component or a Na component (for example, $Li_2O$ or $Na_2O$) degrades the characteristics of various films or semiconductor elements to be formed on the glass substrate. Therefore, it is preferred to reduce the content of the alkaline component. It is desired that the alkaline component be substantially prevented from being contained.

Preferred glass composition ranges can be set by combining the preferred content ranges of the components. Of those, particularly preferred glass composition ranges are as follows:

(1) comprising as a glass composition, in terms of mass %, 59 to 67% of $SiO_2$, 17 to 22% of $Al_2O_3$, 4 to 7% of $B_2O_3$, 0 to 4% of MgO, 3 to 0.10% of CaO, 0 to 5% of SrO, 0.1 to 5% of BaO, 0 to 5% of ZnO, 0 to 5% of $ZrO_2$, 0 to 5% of $TiO_2$, 0 to 5% of $P_2O_5$, and 0 to 5% of $SnO_2$, and being substantially free of a Li component and a Na component; and (2) comprising as a glass composition, in terms of mass %, 60 to 65% of $SiO_2$, 17 to 20% of $Al_2O_3$, 4 to 7% of $B_2O_3$, 0 to 3% of MgO, 4 to 10% of CaO, 0 to 5% of SrO, 0.1 to 5% of BaO, 0 to 1% of ZnO, 0 to 1% of $ZrO_2$, 0 to 1% of $TiO_2$, 0 to 3% of $P_2O_5$, and 0.01 to 1% of $SnO_2$, and being substantially free of a Li component and a Na component.

In recent years, there is an increasing demand for achievement of a reduction in weight in a flat panel display for a mobile application such as an OLED display or a liquid crystal display. Along with this, there is also a demand for achievement of a reduction in weight in a glass substrate. In order to satisfy such demand, the glass substrate is desirably reduced in weight by achieving a low density. The density is preferably 2.52 g/cm³ or less, 2.51 g/cm³ or less, 2.50 g/cm³ or less, 2.49 g/cm³ or less, or 2.48/cm³ or less. In contrast, when the density is too low, the melting temperature is liable to increase, the liquidus viscosity is liable to lower, and productivity of the glass substrate is liable to lower. In addition, the strain point is liable to lower. Therefore, the density is preferably 2.43 g/cm³ or more, 2.44 g/cm³ or more, or 2.45 g/cm³ or more.

In the glass and glass substrate of the present invention, the thermal expansion coefficient is preferably from 30 to 40×10⁻⁷/° C., from 32 to 39×10⁻⁷/° C., from 33 to 38×10⁻⁷/° C., or from 34 to 37×10⁻⁷/° C. Such thermal expansion coefficient easily matches that of a film member to be formed on the glass substrate (for example, of a-Si or p-Si).

In an OLED display, a liquid crystal display, or the like, a glass substrate having a large area (for example, 730×920 mm or more, 1,100×1,250 mm or more, or 1,500×1,500 mm or more) and a glass substrate having a small thickness (for example, a thickness of 0.5 mm or less, 0.4 mm or less, or 0.3 mm or less) tend to be used. In such use of the glass substrate having a large area or a small thickness, there arises a significant problem of deflection due to its own weight. In order to reduce the deflection of a glass substrate, the specific Young's modulus of the glass substrate is required to be increased. The specific Young's modulus is preferably 30.0 GPa/g·cm⁻³ or more, 30.5 GPa/g·cm⁻³ or more, 31.0 GPa/g·cm⁻³ or more, or 31.5 GPa/g·cm⁻³ or more. In addition, in such use of the glass substrate having a large area or a small thickness, there arises a problem of warpage of the glass substrate after a heat treatment step on a surface plate or a step of forming various metal films, oxide films, semiconductor films, organic films, and the like. In order to reduce the warpage of a glass substrate, it is effective to increase the Young's modulus of the glass substrate. The Young's modulus is preferably 75 GPa or more, or 76 GPa or more.

At present, a LTPS to be used for an ultra-high-definition mobile display offers a step at a temperature of about from 400 to 600° C. In order to suppress thermal shrinkage at such temperature in the step, the strain point is preferably 680° C. or more, 690° C. or more, or 700° C. or more.

Recently, an OLED display has been used for a mobile application, a TV application, or the like. As a drive TFT element for those applications, an oxide TFT has been attracted attention, in addition to the LTPS. The oxide TFT has hitherto been produced through a process at a temperature of from 300 to 400° C., which is comparable to that in the case of a-Si. However, it has been revealed that, when annealing is performed at a heat treatment temperature higher than the conventionally employed temperature, more stable element characteristics can be obtained. Such heat treatment temperature is about from 400 to 600° C., and hence a glass substrate exhibiting less thermal shrinkage has been demanded also in this application.

In the glass and glass substrate of the present invention, the thermal shrinkage value, obtained by elevating the temperature from room temperature (25° C.) up to 500° C. at a rate of 10° C./min, keeping the temperature at 500° C. for 1 hour, and dropping the temperature to room temperature at a rate of 10° C./min, is preferably 30 ppm or less, 25 ppm or less, 23 ppm or less, 22 ppm or less, or 21 ppm or less. With such thermal shrinkage value, failures such as a pixel pitch shift do not easily occur even when thermal treatment is applied in manufacturing steps for a LTPS. It should be noted that, when the thermal shrinkage value is too small, the productivity of the glass is liable to lower. Therefore, the thermal shrinkage value is preferably 5 ppm or more, or 8 ppm or more. It should be noted that the thermal shrinkage value can be reduced by lowering the cooling speed during forming, as well as by increasing the strain point.

In an overflow down-draw method, molten glass flows down along the surfaces of a wedge-shaped refractory (or a refractory coated with a platinum group metal), and the molten glasses are joined at the lower end of the wedge-shaped refractory to be formed into a sheet shape. In a slot down-draw method, for example, molten glass in a ribbon shape is allowed to flow down from a pipe made of a platinum group metal having a slit-shaped opening, and then cooled to be formed into a sheet shape. When the temperature of the molten glass brought into contact with a forming device is too high, the forming device ages, and the productivity of the glass substrate is liable to lower. Therefore, the temperature at a viscosity at high temperature of $10^{5.6}$ dPa·s is preferably 1,300° C. or less, 1,280° C. or less, 1,270° C. or less, 1,260° C. or less, 1,250° C. or less, 1,240°

C. or less, or 1,230° C. or less. It should be noted that the temperature at a viscosity at high temperature of $10^{5.6}$ dPa·s corresponds to the temperature of a molten glass at the time of forming.

The $SiO_2$—$Al_2O_3$—$B_2O_3$—RO-based glass according to the present invention is generally hard to melt. Therefore, enhancing the meltability is an issue. When the meltability is enhanced, a defective rate attributed to bubbles, foreign matter, or the like is reduced, and hence a high-quality glass substrate can be supplied at low cost in a large number. In contrast, when the viscosity of the glass in a high-temperature region is too high, removal of bubbles is less promoted in a melting step. Therefore, the temperature at a viscosity at high temperature of $10^{2.5}$ dPa·s is preferably 1,650° C. or less, 1,640° C. or less, 1,630° C. or less, 1,620° C. or less, or 1,610° C. or less. It should be noted that the temperature at a viscosity at high temperature of $10^{2.5}$ dPa·s corresponds to a melting temperature. As the temperature becomes lower, the meltability becomes more excellent.

In forming by a down-draw method or the like, the devitrification resistance is important. In consideration of the forming temperature of the $SiO_2$—$Al_2O_3$—$B_2O_3$—RO-based glass according to the present invention, the liquidus temperature is preferably 1,250° C. or less, 1,230° C. or less, 1,220° C. or less, 1,210° C. or less, 1,200° C. or less, or 1,190° C. or less. In addition, the liquidus viscosity is preferably $10^{5.8}$ dPa·s or more, $10^{5.2}$ dPa·s or more, $10^{5.3}$ dPa·s or more, $10^{5.4}$ dPa·s or more, $10^{5.5}$ dPa·s or more, or $10^{5.6}$ dPa·s or more.

A transparent conductive film, an insulating film, a semiconductor film, a metal film, and the like are formed on a glass substrate to be used in a high-definition display. Further, various circuits and patterns are formed through a photolithography and etching step. The glass substrate is subjected to treatment using various chemical solutions in those film formation step and photolithography and etching step. For example, in the case of a TFT-type active matrix liquid crystal display, an insulating film and a transparent conductive film are formed on a glass substrate, and a number of thin film transistors (TFTs) each formed of amorphous silicon or polycrystalline silicon are further formed on the glass substrate through a photolithography and etching step. In those steps, the glass substrate is subjected to treatment using various chemical solutions such as sulfuric acid, hydrochloric acid, an alkaline solution, hydrofluoric acid, and BHF. In particular, BHF is widely used for etching of an insulating film, but is liable to erode the glass substrate and cause white turbidity in the surface of the glass substrate. In addition, a reaction product thereof may clog a filter during the manufacturing steps or adhere onto the glass substrate. Under the above-mentioned circumstances, it is important to enhance the chemical resistance of the glass substrate.

The glass and glass substrate of the present invention is preferably formed by an overflow down-draw method. The overflow down-draw method refers to a method in which a molten glass is caused to overflow from both sides of a wedge-shaped refractory, and the overflowing molten glasses are subjected to down-draw downward at the lower end of the wedge-shaped refractory while being joined, to thereby form a glass substrate. When a glass substrate is produced by the overflow down-draw method, surfaces that are to serve as the surfaces of the glass substrate are formed in a state of free surfaces without being brought into contact with the refractory. As a result, it is possible to produce a glass substrate having good surface quality without polishing at low cost and an increase in area and a reduction in thickness are easily achieved as well. It should be noted that a material for the refractory to be used in the overflow down-draw method is not particularly limited as long as desired dimensions and surface accuracy can be realized. In addition, a method of applying a force to glass at the time of performing down-draw downward is also not particularly limited. For example, there may be adopted a method involving rotating a heat-resistant roll having a sufficiently large width in a state of being in contact with glass, to thereby draw the glass, or a method involving allowing a plurality of pairs of heat-resistant rolls to come into contact with only the vicinities of end surfaces of glass, to thereby draw the glass.

It is also possible to form a glass substrate by, for example, a down-draw method (such as a slot down method or a redraw method), a float method, or the like, besides the overflow down-draw method.

The thickness of each of the glass and glass substrate of the present invention is not particularly limited, but is preferably 0.5 mm or less, 0.4 mm or less, 0.35 mm or less, or 0.3 mm or less. As the thickness becomes smaller, the weight of a device can be reduced more easily. In contrast, as the thickness becomes smaller, the glass substrate is more liable to be deflected. However, because the glass and glass substrate of the present invention has a high Young's modulus and a high specific Young's modulus, failures attributed to deflection do not easily occur. It should be noted that the thickness can be adjusted by controlling, for example, the flow rate and the sheet-drawing speed at the time of glass production.

The β-OH value of each of the glass and glass substrate of the present invention is preferably 0.5/mm or less, 0.45/mm or less, 0.4/mm or less, or 0.35/mm or less. When the β-OH value is too large, the strain point is liable to lower. It should be noted that, when the β-OH value is too small, the meltability is liable to lower. Thus, the β-OH value is preferably 0.01/mm or more, or 0.05/mm or more.

The following methods are given as methods of reducing the β-OH value. (1) Materials having a low water content are selected, (2) components (such as Cl and $SO_3$) for reducing the water content in glass are added, (3) the water content in the atmosphere in a furnace is reduced, (4) $N_2$ bubbling is carried out in molten glass, (5) a small melting furnace is adopted, (6) the flow rate of molten glass is increased, and (7) an electric melting method is adopted.

Herein, the "β-OH value" refers to a value obtained by measuring the transmittance of glass with an FT-IR and calculating by using the following equation.

$$\beta\text{-OH value}=(1/X)\log(T_1/T_2)$$

X: Glass thickness (mm)

$T_1$: Transmittance (%) at a reference wavelength of 3,846 $cm^{-1}$ $T_2$: Minimum transmittance (%) at a wavelength around a hydroxyl group absorption wavelength of 3,600 $cm^{-1}$ The glass and glass substrate of the present invention are each preferably used for an OLED display. Although the OLED display is now generally commercially available, cost reduction thereof through mass production is strongly desired. The glass and glass substrate of the present invention are excellent in productivity and can be easily increased in area or reduced in thickness, and hence can meet such demands properly.

EXAMPLES

The present invention is hereinafter described in detail by way of Examples. However, Examples below are merely examples, and the present invention is by no means limited thereto.

Tables 1 to 3 show Examples of the present invention (Sample Nos. 1 to 30).

TABLE 1

|  |  | No. 1 | No. 2 | No. 3 | No. 4 | No. 5 |
|---|---|---|---|---|---|---|
| Glass composition (wt %) | $SiO_2$ | 62.7 | 62.7 | 63.7 | 63.7 | 63.7 |
|  | $Al_2O_3$ | 19 | 19 | 18 | 18 | 18 |
|  | $B_2O_3$ | 6 | 6 | 6 | 6 | 6 |
|  | MgO | 1 | 2 | 2 | 1 | 2 |
|  | CaO | 8 | 7 | 8 | 8 | 7 |
|  | SrO | 1 | 1 | — | 1 | 1 |
|  | BaO | 2 | 2 | 2 | 2 | 2 |
|  | $SnO_2$ | 0.3 | 0.3 | 0.3 | 0.3 | 0.3 |
|  | $ZrO_2$ | 0.015 | 0.02 | 0.025 | 0.03 | 0.01 |
|  | $TiO_2$ | 0.01 | 0.01 | 0.01 | 0.005 | 0.005 |
|  | $Fe_2O_3$ | 0.012 | 0.015 | 0.010 | 0.005 | 0.007 |
|  | $Cr_2O_3$ | 0.0001 | 0.0002 | 0.0002 | 0.0001 | 0.0001 |
|  | $Rh_2O_3$ | 0.00005 | 0.00005 | 0.00003 | 0.00005 | 0.00005 |
|  | $SO_3$ | 0.0002 | 0.0001 | 0.0001 | 0.0002 | 0.0002 |
| Density ($g/cm^3$) |  | 2.46 | 2.46 | 2.45 | 2.46 | 2.46 |
| Thermal expansion coefficient [30 to 380° C.] ($\times 10^{-7}$/° C.) |  | 35 | 35 | 35 | 36 | 35 |
| Young's modulus (GPa) |  | 78 | 79 | 80 | 79 | 77 |
| Specific Young's modulus ($GPa/g \cdot cm^{-3}$) |  | 31.5 | 32.0 | 32.5 | 32.0 | 31.4 |
| Strain point (° C.) |  | 709 | 705 | 700 | 706 | 702 |
| Softening point (° C.) |  | 1,007 | 1,001 | 995 | 1,007 | 1,002 |
| Viscosity at high temperature (° C.) | $10^{2.9}$ dPa·s | 1,209 | 1,203 | 1,210 | 1,221 | 1,207 |
|  | $10^{4.5}$ dPa·s | 1,592 | 1,584 | 1,605 | 1,617 | 1,593 |
| Liquidus temperature (° C.) |  | 1,187 | 1,195 | 1,194 | 1,193 | 1,197 |
| Liquidus viscosity log η (dPa·s) |  | 5.2 | 5.1 | 5.2 | 5.3 | 5.1 |
| Chemical resistance | HCl | ○ | ○ | ○ | ○ | ○ |
|  | BHF | ○ | ○ | ○ | ○ | ○ |

|  |  | No. 6 | No. 7 | No. 8 | No. 9 | No. 10 |
|---|---|---|---|---|---|---|
| Glass composition (wt %) | $SiO_2$ | 62.7 | 62.7 | 63.7 | 63.7 | 62.7 |
|  | $Al_2O_3$ | 19 | 19 | 18 | 18 | 19 |
|  | $B_2O_3$ | 6 | 6 | 6 | 6 | 6 |
|  | MgO | — | 2 | — | 2 | 1 |
|  | CaO | 8 | 6 | 10 | 4 | 8 |
|  | SrO | 2 | 2 | — | 4 | 2 |
|  | BaO | 2 | 2 | 2 | 2 | 1 |
|  | $SnO_2$ | 0.3 | 0.3 | 0.3 | 0.3 | 0.3 |
|  | $ZrO_2$ | 0.01 | 0.01 | 0.01 | 0.01 | 0.01 |
|  | $TiO_2$ | 0.01 | 0.005 | 0.005 | 0.01 | 0.02 |
|  | $Fe_2O_3$ | 0.005 | 0.006 | 0.007 | 0.009 | 0.010 |
|  | $Cr_2O_3$ | 0.0001 | 0.0001 | 0.0001 | 0.0002 | 0.0001 |
|  | $Rh_2O_3$ | 0.00005 | 0.00006 | 0.00005 | 0.0001 | 0.00005 |
|  | $SO_3$ | 0.0001 | 0.0001 | 0.0003 | 0.0003 | 0.0002 |
| Density ($g/cm^3$) |  | 2.47 | 2.47 | 2.45 | 2.47 | 2.46 |
| Thermal expansion coefficient [30 to 380° C.] ($\times 10^{-7}$/° C.) |  | 35 | 34 | 37 | 33 | 36 |
| Young's modulus (GPa) |  | 76 | 78 | 76 | 77 | 78 |
| Specific Young's modulus ($GPa/g \cdot cm^{-3}$) |  | 31.0 | 31.7 | 31.1 | 31.1 | 31.5 |
| Strain point (° C.) |  | 718 | 708 | 709 | 707 | 710 |
| Softening point (° C.) |  | 1,018 | 1,006 | 1,008 | 1,018 | 1,005 |
| Viscosity at high temperature (° C.) | $10^{2.9}$ dPa·s | 1,221 | 1,210 | 1,213 | 1,232 | 1,209 |
|  | $10^{4.5}$ dPa·s | 1,630 | 1,595 | 1,617 | 1,629 | 1,613 |
| Liquidus temperature (° C.) |  | 1,198 | 1,198 | 1,200 | 1,212 | 1,183 |
| Liquidus viscosity log η (dPa·5.2 s) |  | 5.1 | 5.1 | 5.2 | 5.3 | s) |
| Chemical resistance | HCl | ○ | ○ | ○ | ○ | ○ |
|  | BHF | ○ | ○ | ○ | ○ | ○ |

TABLE 2

|  |  | No. 11 | No. 12 | No. 13 | No. 14 | No. 15 |
|---|---|---|---|---|---|---|
| Glass composition (wt %) | $SiO_2$ | 63.3 | 62.8 | 62.6 | 63.2 | 63.3 |
|  | $Al_2O_3$ | 19 | 19 | 19 | 18 | 18 |
|  | $B_2O_3$ | 5.5 | 6 | 6.2 | 6 | 5.9 |
|  | MgO | 1 | 1 | — | 1 | 1 |
|  | CaO | 8 | 7 | 9 | 8 | 7 |
|  | SrO | 2 | 2 | 1 | 1 | 1 |
|  | BaO | 1 | 2 | 2 | 2.5 | 2.5 |
|  | $SnO_2$ | 0.2 | 0.2 | 0.2 | 0.3 | 0.3 |
|  | $ZrO_2$ | 0.01 | 0.02 | 0.02 | 0.03 | 0.01 |
|  | $TiO_2$ | 0.005 | 0.005 | 0.006 | 0.005 | 0.003 |
|  | $Fe_2O_3$ | 0.012 | 0.013 | 0.014 | 0.014 | 0.012 |

TABLE 2-continued

| | | | | | | |
|---|---|---|---|---|---|---|
| | $Cr_2O_3$ | 0.0002 | 0.0002 | 0.0002 | 0.0001 | 0.0001 |
| | $Rh_2O_3$ | 0.00004 | 0.00004 | 0.00003 | 0.00003 | 0.00003 |
| | $SO_3$ | 0.0001 | 0.0001 | 0.0001 | 0.0002 | 0.0002 |
| Density (g/cm³) | | 2.47 | 2.47 | 2.47 | 2.47 | 2.47 |
| Thermal expansion coefficient [30 to 380° C.] (×10⁻⁷/° C.) | | 36 | 35 | 37 | 36 | 36 |
| Young's modulus (GPa) | | 78 | 77 | 76 | 77 | 77 |
| Specific Young's modulus (GPa/g · cm⁻³) | | 31.6 | 31.2 | 31.0 | 31.1 | 31.3 |
| Strain point (° C.) | | 714 | 710 | 716 | 705 | 701 |
| Softening point (° C.) | | 1,012 | 1,011 | 1,014 | 1,005 | 999 |
| Viscosity at high temperature (° C.) | $10^{2.9}$ dPa · s | 1,216 | 1,217 | 1,220 | 1,212 | 1,207 |
| | $10^{4.5}$ dPa · s | 1,623 | 1,602 | 1,615 | 1,597 | 1,601 |
| Liquidus temperature (° C.) | | 1,193 | 1,179 | 1,208 | 1,179 | 1,190 |
| Liquidus viscosity logη (dPa · s) | | 5.2 | 5.4 | 5.1 | 5.3 | 5.1 |
| Chemical resistance | HCl | ○ | ○ | ○ | ○ | ○ |
| | BHF | ○ | ○ | ○ | ○ | ○ |
| Thermal shrinkage value (ppm) | | 18 | 18 | 17 | 21 | 22 |

| | | No. 16 | No. 17 | No. 18 | No. 19 | No. 20 |
|---|---|---|---|---|---|---|
| Glass composition (wt %) | $SiO_2$ | 62.4 | 62.3 | 62.2 | 62.6 | 63.2 |
| | $Al_2O_3$ | 19.5 | 19.5 | 19.5 | 19.5 | 19 |
| | $B_2O_3$ | 5.8 | 6.1 | 6.2 | 5.7 | 5.6 |
| | MgO | — | 1 | 1 | 2 | 1 |
| | CaO | 8 | 8 | 7 | 8 | 7.5 |
| | SrO | 3 | 2 | 3 | 1 | 2 |
| | BaO | 1 | 1 | 1 | 1 | 1.5 |
| | $SnO_2$ | 0.3 | 0.1 | 0.1 | 0.2 | 0.2 |
| | $ZrO_2$ | 0.01 | 0.01 | 0.02 | 0.02 | 0.01 |
| | $TiO_2$ | 0.005 | 0.006 | 0.005 | 0.005 | 0.005 |
| | $Fe_2O_3$ | 0.012 | 0.011 | 0.011 | 0.011 | 0.013 |
| | $Cr_2O_3$ | 0.0001 | 0.0001 | 0.0001 | 0.0001 | 0.0001 |
| | $Rh_2O_3$ | 0.00002 | 0.00003 | 0.00004 | 0.00006 | 0.00006 |
| | $SO_3$ | 0.0002 | 0.0004 | 0.0004 | 0.0003 | 0.0002 |
| Density (g/cm³) | | 2.47 | 2.47 | 2.47 | 2.46 | 2.47 |
| Thermal expansion coefficient [30 to 380° C.] (×10⁻⁷/° C.) | | 36 | 36 | 35 | 36 | 35 |
| Young's modulus (GPa) | | 76 | 78 | 77 | 79 | 78 |
| Specific Young's modulus (GPa/g · cm⁻³) | | 30.9 | 31.5 | 31.2 | 32.0 | 31.5 |
| Strain point (° C.) | | 716 | 713 | 715 | 706 | 714 |
| Softening point (° C.) | | 1,014 | 1,007 | 1,013 | 995 | 1,012 |
| Viscosity at high temperature (° C.) | $10^{2.9}$ dPa · s | 1,211 | 1,205 | 1,219 | 1,199 | 1,214 |
| | $10^{4.5}$ dPa · s | 1,584 | 1,588 | 1,628 | 1,580 | 1,603 |
| Liquidus temperature (° C.) | | 1,203 | 1,197 | 1,208 | 1,178 | 1,178 |
| Liquidus viscosity logη (dPa · s) | | 5.1 | 5.1 | 5.1 | 5.2 | 5.4 |
| Chemical resistance | HCl | ○ | ○ | ○ | ○ | ○ |
| | BHF | ○ | ○ | ○ | ○ | ○ |
| Thermal shrinkage value (ppm) | | 18 | 20 | 18 | 21 | 20 |

TABLE 3

| | | No. 21 | No. 22 | No. 23 | No. 24 | No. 25 |
|---|---|---|---|---|---|---|
| Glass composition (wt %) | $SiO_2$ | 62.05 | 62.2 | 62.7 | 62.2 | 62.7 |
| | $Al_2O_3$ | 19.5 | 19 | 19 | 19 | 19 |
| | $B_2O_3$ | 5.95 | 6 | 6 | 6.5 | 6 |
| | MgO | 1.5 | 1.5 | 1.1 | 1.1 | 1 |
| | CaO | 6.9 | 7.1 | 7 | 7 | 7 |
| | SrO | 1.9 | 2 | 2.1 | 2 | 3 |
| | BaO | 1.9 | 2 | 2 | 2 | 1 |
| | $SnO_2$ | 0.2 | 0.2 | 0.2 | 0.2 | 0.3 |
| Density (g/cm³) | | 2.47 | 2.48 | 2.47 | 2.46 | 2.47 |
| Thermal expansion coefficient [30 to 380° C.] (×10⁻⁷/° C.) | | 35 | 36 | 35 | 35 | 35 |
| Young's modulus (GPa) | | 78 | 78 | 77 | 76 | 76 |
| Specific Young's modulus (GPa/g · cm⁻³) | | 31.6 | 31.4 | 31.2 | 31.0 | 30.9 |
| Strain point (° C.) | | 709 | 706 | 712 | 703 | 707 |
| Softening point (° C.) | | 1,004 | 1,002 | 1,013 | 1,007 | 1,008 |
| Viscosity at high temperature (° C.) | $10^{2.9}$ dPa · s | 1,204 | 1,205 | 1,219 | 1,213 | 1,211 |
| | $10^{4.5}$ dPa · s | 1,585 | 1,590 | 1,605 | 1,601 | 1,596 |
| Liquidus temperature (° C.) | | 1,187 | 1,178 | 1,165 | 1,163 | 1,172 |
| Liquidus viscosity logη (dPa · s) | | 5.2 | 5.3 | 5.6 | 5.5 | 5.4 |
| Chemical resistance | HCl | ○ | ○ | ○ | ○ | ○ |
| | BHF | ○ | ○ | ○ | ○ | ○ |
| Thermal shrinkage value (ppm) | | 20 | 22 | 20 | 21 | 19 |

TABLE 3-continued

|  |  | No. 26 | No. 27 | No. 28 | No. 29 | No. 30 |
|---|---|---|---|---|---|---|
| Glass composition (wt %) | $SiO_2$ | 63.3 | 63.6 | 63.2 | 63.2 | 62.7 |
|  | $Al_2O_3$ | 19.1 | 19.2 | 18.5 | 18 | 19 |
|  | $B_2O_3$ | 5.5 | 5 | 6 | 6 | 6 |
|  | MgO | 1 | 1 | — | 0.5 | — |
|  | CaO | 7 | 7 | 8 | 8 | 8.1 |
|  | SrO | 2 | 2 | 3.1 | 3 | 3 |
|  | BaO | 2 | 2 | 1 | 1.1 | 1 |
|  | $SnO_2$ | 0.3 | 0.3 | 0.2 | 0.2 | 0.2 |
| Density (g/cm³) |  | 2.47 | 2.48 | 2.46 | 2.47 | 2.47 |
| Thermal expansion coefficient [30 to 380° C.] (×10⁻⁷/° C.) |  | 35 | 35 | 36 | 36 | 36 |
| Young's modulus (GPa) |  | 77 | 78 | 76 | 76 | 76 |
| Specific Young's modulus (GPa/g · cm⁻³) |  | 31.3 | 31.4 | 30.8 | 31.0 | 31.0 |
| Strain point (° C.) |  | 716 | 719 | 712 | 707 | 716 |
| Softening point (° C.) |  | 1,017 | 1,020 | 1,019 | 1,008 | 1,017 |
| Viscosity at high temperature (° C.) | $10^{2.9}$ dPa · s | 1,224 | — | 1,224 | — | — |
|  | $10^{4.5}$ dPa · s | 1,627 | 1,619 | 1,616 | 1,602 | 1,626 |
| Liquidus temperature (° C.) |  | 1,191 | 1,204 | 1,191 | 1,195 | 1,197 |
| Liquidus viscosity log η (dPa · s) |  | 5.3 | 5.3 | 5.3 | 5.2 | 5.3 |
| Chemical resistance | HCl | ○ | ○ | ○ | ○ | ○ |
|  | BHF | ○ | ○ | ○ | ○ | ○ |
| Thermal shrinkage value (ppm) |  | 18 | 16 | 19 | 22 | 17 |

Each sample was produced in the following manner. First, a glass batch prepared by blending glass raw materials so that each glass composition listed in the tables was attained was placed in a platinum crucible, and then melted at 1,600° C. for 24 hours. When the glass batch was dissolved, molten glass was stirred by using a platinum stirrer to homogenize it. Next, the molten glass was poured on a carbon sheet and formed into a glass sheet. Each of the resultant samples was evaluated for its density, thermal expansion coefficient, Young's modulus, specific Young's modulus, strain point, softening point, temperature at a viscosity at high temperature of $10^{5.8}$ dPa·s, temperature at a viscosity at high temperature of $10^{2.5}$ dPa·s, liquidus temperature, liquidus viscosity log ηTL, and chemical resistance.

The density is a value obtained by measurement by a well-known Archimedes method.

The thermal expansion coefficient is an average thermal expansion coefficient measured in the temperature range of from 30 to 380° C. with a dilatometer.

The Young's modulus refers to a value measured by a dynamic elastic modulus measurement method (resonance method) in accordance with JIS R1602, and the specific Young's modulus is a value obtained by dividing the Young's modulus by the density.

The strain point and the softening temperature are values obtained by measurement based on the method of ASTM C336.

The temperatures at viscosities at high temperature of $10^{5.0}$ dPa·s and $10^{2.5}$ dPa·s are values obtained by measurement by a platinum sphere pull up method.

Next, each of the samples was pulverized, and glass powder that passed through a standard 30-mesh sieve (500 μm) and remained on a 50-mesh sieve (300 μm) was placed in a platinum boat and kept for 24 hours in a gradient heating furnace, followed by taking the platinum boat out of the gradient heating furnace. The temperature at which devitrification (crystalline foreign matter) was observed in the glass was defined as the liquidus temperature. Further, the viscosity of the glass at the liquidus temperature was measured by a platinum sphere pull up method and was defined as the liquidus viscosity.

In addition, each of the samples was optically polished on both surfaces, and then immersed in a chemical solution having a predetermined concentration at a predetermined temperature for a predetermined time period. The chemical resistance was evaluated by observing the surface of the obtained sample. Specifically, after the treatment using the chemical solution, the case where the glass surface had white turbidity or cracks was represented by Symbol "x", the case where the glass surface had slight white turbidity or appeared to be rough was represented by Symbol "Δ", and the case where the glass surface had no change was represented by Symbol "○". The conditions of the treatment using the chemical solution are as follows: the acid resistance was evaluated by treatment using a 10% hydrochloric acid at 80° C. for 3 hours; and the BHF resistance was evaluated by treatment using a well-known 130 BHF solution at 20° C. for 30 minutes.

Figure 1B:
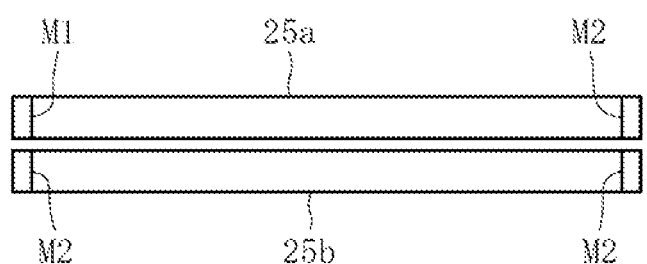
FIG. 1b is a front view illustrating a state in which the glass substrate having marks placed thereon is divided into two pieces of glass sheets.
Figure 1C:
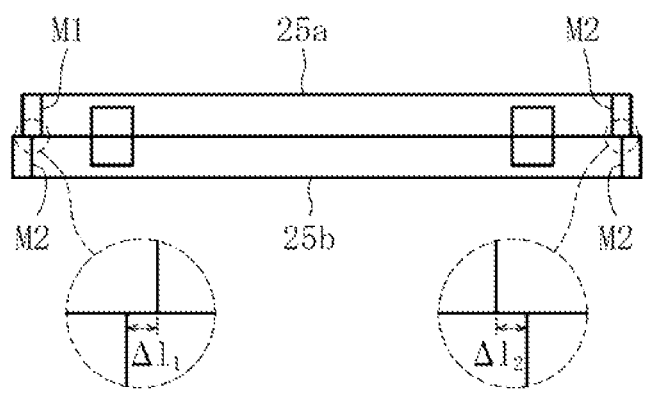
FIG. 1c is a schematic view illustrating shift amounts between the marks placed on the respective two pieces of glass sheets.

Further, by using each of the samples Nos. 11 to 30 in Tables 2 and 3, a glass substrate having a thickness of 0.5 mm was experimentally produced by an overflow downdraw method, and measured fox the thermal shrinkage value. First, a sample measuring 30 mm×160 mm×0.5 mm was cut out from each of the glass substrates, and each of the samples was measured for the thermal shrinkage value in the following manner. As illustrated in FIG. 1a, linear marks, M1 and M2, were placed at two predetermined positions on a glass substrate 25 with a predetermined interval therebetween, and then as illustrated in FIG. 1b, the glass substrate 25 was divided in the direction perpendicular to the marks M, to provide a glass sheet piece 25a and a glass sheet piece 25b. Then, only the glass sheet piece 25a was subjected to heat treatment in which the temperature was elevated from normal temperature up to 500° C. at a rate of 10° C./min, kept at 500° C. for 1 hour, and cooled to normal temperature at a rate of 10° C./min. After that, as illustrated in FIG. 1c, the glass sheet piece 25a having been subjected to the heat treatment and the glass sheet piece 25b not having been subjected to the heat treatment were arranged next to each other and fixed by an adhesion tape T. In that state, the shift amounts between the marks M1 and M2 on the glass sheet piece 25a and the marks M1 and M2 on the glass sheet piece 25b were measured, and the thermal shrinkage value was calculated based on the following mathematical formula 1.

Thermal shrinkage value (ppm)=$(\Delta l_1 (\mu m) + \Delta l_2 (\mu m))/l_0$ (m)

In the mathematical formula 1, $l_0$ represents the distance between the marks Ms on the glass substrate 25, $l_1$ represents the distance between the mark M1 on the glass sheet piece 25a and the mark M1 on the glass sheet piece 25b, and $l_2$ represents the distance between the mark M2 on the glass sheet piece 25a and the mark M2 on the glass sheet piece 25b.

The samples Nos. 1 to 30 each have a density of from 2.43 to 2.52 g/cm³, and can achieve a reduction in weight of a glass substrate. In addition, the thermal expansion coefficient is from 30 to $40 \times 10^{-2}$/° C., the strain point is 680° C. or more and less than 740° C., and the thermal shrinkage value is small. In addition, the Young's modulus is 75 GPa or more, the specific Young's modulus is 30 GPa/(g/cm³) or more, and deflection and deformation hardly occur. In addition, the temperature at a viscosity at high temperature of $10^{5.8}$ dPa·s is 1,250° C. or less, and the temperature at a viscosity at high temperature of $10^{2.5}$ dPa·s is 1,650° C. or less. Further, the liquidus temperature is 1,300° C. or less, and the liquidus viscosity is $10^{5.6}$ dPa·s or more. Therefore, the meltability and the formability are excellent, and mass-production can be applied. Further, the chemical resistance is excellent.

INDUSTRIAL APPLICABILITY

The glass and glass substrate of the present invention contain an alkaline component at a low content, are low in density and thermal expansion coefficient, are high in strain point and Young's modulus, and are excellent in devitrification resistance, meltability, formability, and the like. Accordingly, the glass and glass substrate of the present invention are suitable for a display such as an OLED display or a liquid crystal display, and particularly for a display driven by a LTPS or an oxide TFT.

REFERENCE SIGNS LIST

25 glass substrate
25a glass sheet piece
25b glass sheet piece
M mark
M1 mark
M2 mark

The invention claimed is:

1. A glass, comprising as a glass composition, in terms of mass %, 58 to 70% of $SiO_2$, 16 to 25% of $Al_2O_3$, 3 to 8% of $B_2O_3$, 0 to 5% of MgO, 3 to 13% of CaO, 0 to 6% of SrO, 0 to 6% of BaO, 0 to 5% of ZnO, 0 to 5% of $ZrO_2$, 0 to 0.05% of $TiO_2$, 0 to 5% of $P_2O_5$, 0.005 to 0.5% of $Fe_2O_3$, 0.01 to 1% of $SnO_2$, 0 to less than 0.1% of $Sb_2O_3$, and 0.00001-0.0005% of $Rh_2O_3$, and having a liquid phase viscosity of $10^{5.0}$ dPa·s or more.

2. A glass, comprising as a glass composition, in terms of mass %, 58 to 70% of $SiO_2$, 16 to 25% of $Al_2O_3$, 3 to 8% of $B_2O_3$, 0 to 5% of MgO, 3 to 13% of CaO, 0 to 6% of SrO, 0 to 6% of BaO, 0 to 5% of ZnO, 0 to 5% of $ZrO_2$, 0 to 0.05% of $TiO_2$, 0 to 5% of $P_2O_5$, 0.005 to 0.5% of $Fe_2O_3$, 0.01 to 1% of $SnO_2$, 0 to less than 0.1% of $Sb_2O_3$, and 0.00001-0.0005% of $Rh_2O_3$, being substantially free of a Li component and a Na component, and having a liquid phase viscosity of $10^{5.0}$ dPa·s or more, a density of from 2.43 to 2.52 g/cm³ and a strain point of 680° C. or more.

3. The glass according to claim 1 or 2, being substantially free of a Li component and a Na component, and having a density of from 2.43 to 2.52 g/cm³, a thermal expansion coefficient of from 30 to $40 \times 10^{-7}$/° C., a Young's modulus of 75 GPa or more, a strain point of 680° C. or more and less than 740° C., a temperature at $10^{5.0}$ dPa·s of 1,250° C. or less, and a temperature at $10^{2.5}$ dPa·s of 1,650° C. or less.

4. The glass according to claim 1 or 2, comprising as a glass composition, in terms of mass %, 59 to 67% of $SiO_2$, 17 to 22% of $Al_2O_3$, 5 to 7% of $B_2O_3$, 0 to 4% of MgO, 3 to 12% of CaO, 0 to 5% of SrO, 0.1 to 5% of BaO, 0 to 5% of ZnO, 0 to 5% of $ZrO_2$, 0 to 0.05% of $TiO_2$, 0 to 5% of $P_2O_5$, 0.005 to 0.5% of $Fe_2O_3$, 0.01 to 1% of $SnO_2$, and 0 to less than 0.1% of $Sb_2O_3$, and being substantially free of a Li component and a Na component.

5. The glass according to claim 1 or 2, comprising as a glass composition, in terms of mass %, 60 to 65% of $SiO_2$, 17 to 20% of $Al_2O_3$, 5 to 7% of $B_2O_3$, 0 to 3% of MgO, 4 to 10% of CaO, 0 to 5% of SrO, 0.1 to 5% of BaO, 0 to 1% of ZnO, 0 to 1% of $ZrO_2$, 0 to 0.05% of $TiO_2$, 0 to 3% of $P_2O_5$, 0.005 to 0.5% of $Fe_2O_3$, 0.01 to 1% of $SnO_2$, and 0 to less than 0.1% of $Sb_2O_3$, and being substantially free of a Li component and a Na component.

6. A glass substrate, comprising the glass according to claim 1 or 2.

7. The glass substrate according to claim 6, wherein the glass substrate is used for an OLED display.

8. The glass substrate according to claim 6, wherein the glass substrate is used for a liquid crystal display.

9. The glass substrate according to claim 6, wherein the glass substrate is used for a display driven by an oxide TFT.

* * * * *